United States Patent [19]
Fell et al.

[11] 4,390,913
[45] Jun. 28, 1983

[54] TAPE CASSETTE AND CASSETTE RECEIVER COMBINATION FOR TRANSDUCING APPARATUS

[75] Inventors: Wolfgang Fell, Seeheim; Werner Sanders, Darmstadt, both of Fed. Rep. of Germany

[73] Assignee: Robert Bosch GmbH, Stuttgart, Fed. Rep. of Germany

[21] Appl. No.: 211,839

[22] Filed: Dec. 1, 1980

[30] Foreign Application Priority Data

Dec. 19, 1979 [DE] Fed. Rep. of Germany ....... 2951109

[51] Int. Cl.³ ............................................. G11B 15/00
[52] U.S. Cl. ...................................... 360/85; 360/93; 360/96.5; 242/198
[58] Field of Search ............................. 360/85, 93–95, 360/96.5, 132, 137; 242/55.19 A, 193–194

[56] References Cited

U.S. PATENT DOCUMENTS

| | | | |
|---|---|---|---|
| 3,803,368 | 4/1974 | Artner et al. | 360/93 X |
| 3,863,267 | 1/1975 | Yasukatsu | 360/93 |
| 3,916,442 | 10/1975 | Dattilo et al. | 360/93 |
| 3,957,225 | 5/1976 | Vogel | 360/96.5 X |
| 4,071,859 | 1/1978 | Sami | 360/96.5 |
| 4,254,922 | 3/1981 | Wolf et al. | 360/132 X |

FOREIGN PATENT DOCUMENTS 2822631 11/1978 Fed. Rep. of Germany ..... 360/96.5

Primary Examiner—John H. Wolff
Attorney, Agent, or Firm—Frishauf, Holtz, Goodman & Woodward

[57] ABSTRACT

To place superposed tape reels (14, 15) located in a cassette (10, 11) in a tape receiver (2) of a tape transducer system, which includes means to pull out tape from the cassette for threading in the system (see U.S. Pat. No. 4,254,922), a lever and cam system (32, 33, 34; 16, 31, 40, 41) is provided in which a cam follower (31) is located on the housing (11) of the cassette to engage a cam track (40) in a transfer lever (32) secured to the receiver. The transfer lever (32) has a second cam track (41) which is spaced farther from the pivot point (35) of the lever, the second cam track engaging a pin (16) coupled to a slidable carrier plate (12) in the cassette, and supporting the reels (14, 15) therein. Upon insertion of the cassette in the receiver, the cam follower (31) engages the cam track (40) of the transfer lever which, by lever action multiplication, upon engagement with the pin 16, will pull the carrier plate (12) out of the cassette, thus removing the reels from the cassette housing (10, 11). An ejection lever (33) is connected to the transfer lever (32) by a lost motion to provide for ejection, without interfering with insertion.

11 Claims, 7 Drawing Figures

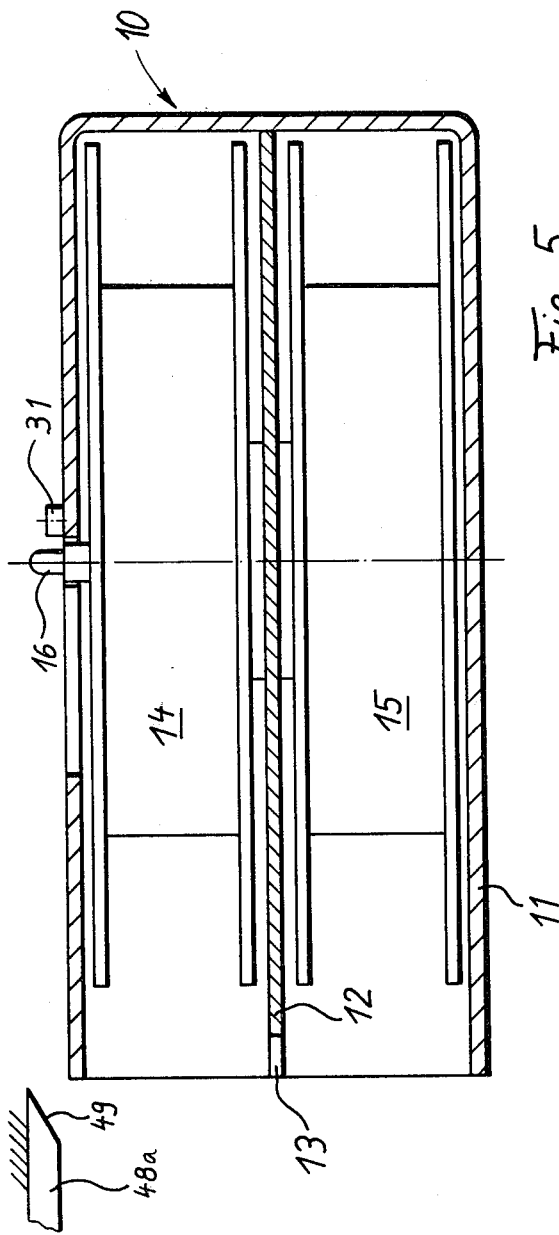
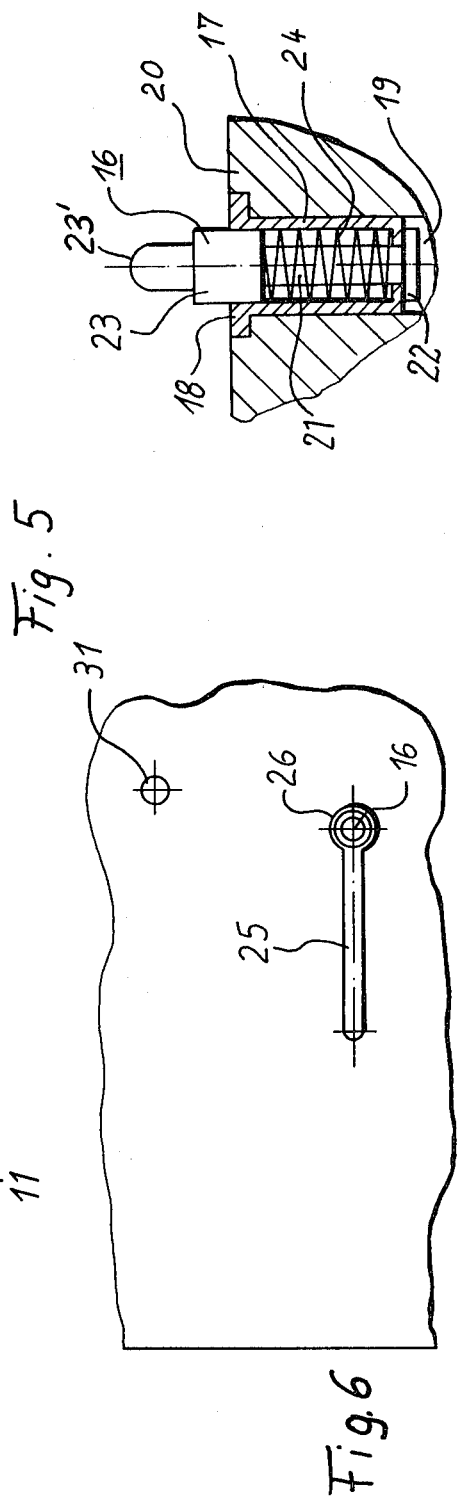

TAPE CASSETTE AND CASSETTE RECEIVER COMBINATION FOR TRANSDUCING APPARATUS

Reference to related applications and patents, assigned to the assignee of this application, the disclosure of which is hereby incorporated by reference:

U.S. Ser. No. 06/010,620, filed Feb. 9, 1979, GAUSE, now U.S. Pat. No. 4,259,700

U.S. Ser. No. 06/010,816, filed Feb. 9, 1979, WOLF et al, now U.S. Pat. No. 4,254,922

The present invention relates to tape recording or transducing apparatus, and more particularly to apparatus to place video tape cassettes into a cassette receiver from which a threading loop can then be pulled out by a threading mechanism.

BACKGROUND AND PRIOR ART

The referenced applications Ser. No. 06/010,620, GAUSE, now U.S. Pat. No. 4,259,700, and Ser. No. 06/010,816, WOLF et al, now U.S. Pat. No. 4,254,922, describe tape recording apparatus particularly suitable for professional video tape transducing apparatus in which tape reels are held in a cassette housing on a longitudinally slidable separating wall. A loop of tape can be removed from the reel automatically and placed in a suitable tape transducing apparatus by engaging the tape with tape guide elements as explained in the aforementioned patents. In order to place the tape in the cassette in threading position, it was necessary to move the tape out of the cassette structure itself into a position where it can be engaged by the tape guide elements of the threading apparatus explained in the aforementioned application. This manual handling of the tapes in the cassettes required care and skill on part of the operator so that the tape is properly removed from the cassettes for subsequent handling by the tape guide apparatus, and proper threading thereby. The tape reels are normally stored in the cassettes; video tape, which is much wider than audio recording tape, can be stored in two superposed reels on the common support wall—as explained in the referenced applications; after removal, the tape reels are lowered into an operating position. It is also possible to push the tape reels manually out of the cassette, leaving the separating wall therein. In any event, and regardless of the specific construction, care and skill on part of the operator are required.

THE INVENTION

It is an object to provide a recording tape spooling apparatus which is so constructed that tape reels can be stored in a cassette in superposed relation, inserted in the apparatus, and placed into operative position without requiring intervention by an operator other than moving the cassette into the receiving apparatus.

Briefly, the invention relates to spooling apparatus of the type in which a tape cassette, having a housing structure open in one end, supports a tape reel carrier on which tape reels are positioned. The tape reel carrier, typically a separating wall of the housing structure, is longitudinally slidable in the housing structure, that is, in a plane which is transverse to the axis of rotation of the superposed tape reels. The tape receiver construction defines a receiving chamber in which the reels are to be placed. In accordance with the present invention, a lever arrangement is provided secured to the receiver structure and positioned to be engaged by the cassette housing upon insertion movement of the cassette housing structure thereinto. A lever is coupled to engage a tape reel or both tape reels or, for example, the tape reel carrier and to be engaged by the cassette housing with a different lever arm, to effect longitudinal movement of the tape reel carrier—and hence the tape reels with respect to the cassette and—into the chamber upon insertion movement of the cassette, by controlling an additional movement of the reels, i.e. with respect to the cassette structure itself.

In accordance with a preferred feature of the invention, the lever includes two slotted cam tracks, one of which engages a projection formed on the cassette housing, and the other engages a projection coupled to or forming part of the center of the reels or a support element coupled to the separating wall on which the reels are mounted. Thus, upon engagement of the projection of the cassette housing in one of the cam tracks, and by suitable differently angled position of the cam tracks, movement of the lever will control additional movement of the separating wall on which the reels are mounted, and hence of the reels in a direction to move the reels out of protected position within the cassette housing so that a tape loop is then exposed. The loop can be engaged by threading mechanism of the tape recording apparatus, with which the tape is to be used. The transducing apparatus, and the threading mechanism therefor, can be as described in the referenced U.S. Pat. Nos. 4,259,700 and 4,254,922.

The system has the advantage that movement of the carrier for the reels from the reel housing structure or the cassette housing will be effected automatically and entirely independently of the skill or attention of the operator who places the cassette into the cassette receiver.

The apparatus has the additional advantage that the force required to remove the cassette, after threading, and for example after reproduction of program content from the tape, can be kept small; and, further, that special ejection springs for removal of the cassette or the reels, separately, are not needed, so that insertion of the cassette can be easily accomplished without having to overcome the forces of an ejection spring. The apparatus is simple, can be small and lightweight, which is particularly important for portable equipment.

DRAWINGS

FIG. 5 is a highly schematic longitudinal cross-sectional view through the tape cassette with a portion of the receiving apparatus shown schematically to illustrate the interaction between the cassette and the receiver apparatus;

FIG. 6 is a fragmentary top view of the cassette of FIG. 5 and illustrating the elements which cooperate with the receiver mechanism; and FIG. 7 is a greatly enlarged transverse sectional view showing a detail of the cassette.

Figure 1:
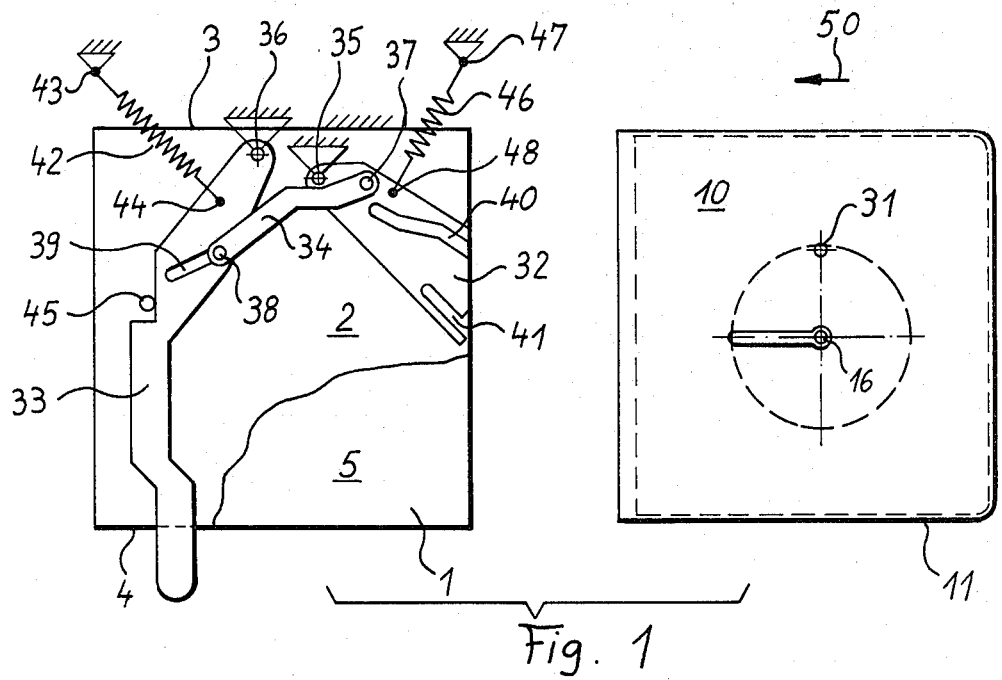
FIG. 1 is a highly schematic top view of a tape recording spooling apparatus with a tape cassette positioned laterally thereof for imminent insertion into the spooling apparatus.

A tape receiving chamber 1 (FIGS. 1-4) is defined by a frame or support structure, to be of essentially longitudinally tubular form with a cross-sectional shape of approximately that of the cross section of a cassette. The four walls defining the chamber 1 are a bottom plate 2 (FIG. 1), side walls 3 and 4, and a cover plate 5 which, in FIG. 1, is shown broken away and which has been omitted from FIGS. 2-4 for clarity and to permit illustration of the operating structure in full lines.

The cassette 10 (see FIG. 5) has a cassette housing 11 open at one narrow side. The cassette housing has a plan view in the shape of the clear cross section of the chamber 1. A longitudinally slidable reel carrier plate 12 is positioned in the cassette, slidable in a groove 13 and formed in a side wall of the housing 11 of the cassette. Rotatable reels 14, 15 carrying the tape are supported on the top side and the bottom side of the carrier plate 12 by reel holders (not shown). A spring-loaded pin 16 is positioned at the top side of the reel carrier 12 concentric to the axis of rotation of the reels. The details of spring-loaded pin 16 are shown in FIG. 7 to enlarged scale. A sleeve 17 is seated with a flange 18 flush within a bore 19 of the center shaft or core 20 of the reel, for example by being press-fitted therein. Pin 16 is longitudinally slidable within the sleeve 17. The pin 16 has a shaft 21 with a flange 22 at the lower end, and a head 23 of reduced end portion. A spring 24 presses the head 23 upwardly so that, in quiescent condition, the flange 22 will engage the sleeve 17, and hence arrest relative rotary movement between the sleeve 17, and hence the core 20 of the reel 14 with respect to the pin 16.

The upper side of the housing of the cassette is formed with a slot 25 (FIG. 6) which, generally, has keyhole shape, that is, is formed with a region of enlarged diameter to receive the head 23. The remainder of the slot 25 has a smaller diameter to receive only the reduced head portion 23' (FIG. 7) of the head. The upper side wall of the cassette, further, is formed with a projection 31 to define a receiver cam which extends from the top wall of the housing by a predetermined distance.

The details of the receiver structure are best seen in FIGS. 1-4: The inside of the cover plate 5—shown only in FIG. 1—supports a combination of links and levers, formed by a first lever 32, an ejection lever 33, and a coupling lever 34. The first lever, which may be termed a transfer lever 32, has a shaft 35 which secures the transfer lever 32 rotatably on the cover plate 5. The ejection lever 33 also is rotatably attached to the cover plate 5 by a stub shaft 36. Coupling lever 34 is pivoted with a shaft, for example a rivet, 37 on the transfer lever 32 and is formed with a guide pin 38 which fits into a guide groove 39 for slidable movement within the ejection lever 33. The transfer lever 32 has two cam tracks, typically in the form of guide ways or guide slots 40, 41, positioned at respectively different distances from the axis of rotation 35 of the lever 32. The guide track 40 is dimensioned to receive the cam projection 31 extending from the housing 11 of the cassette. The guide track 41 is dimensioned to receive the head portion 23' of the pin 16. The guide tracks or cam tracks 40, 41 are therefore suitably dimensioned to cooperate, respectively, with elements 31 and 16.

A first tension spring 42 is secured with one end at a point 43, secured to the frame structure of the receiver, and at its other end at a point 44 of the ejection lever 33. In quiescent position, spring 42 pulls the ejection lever 33 against a stop 45, formed on the cover plate 5 of the cassette receiver, and covering the chamber 1 (see FIGS. 1, 2, 3). A second tension spring 46 is attached to a fixed point 47 on the receiver and, with the other end, on the transfer lever 32 at point 48 and pulls the transfer lever in counterclockwise direction in the quiescent position shown in FIG. 1. The transfer lever 41 can be placed in this position by engagement with a stop on a side wall of the cassette frame, the top wall 5 covering the chamber 1, or it can be retained in the position shown in FIG. 1 by suitable dimensioning and placement of the respective attachment points 44, 48 of the spring 42, 46, the coupling element 34, the guide track 39, and the linkage arrangement formed by the links 33, 34, 32, that is, by locating the respective attachment points so that the springs, essentially, will be in balance in the position shown in FIG. 1.

The cover plate 5 covers not only the chamber 1 shown in FIG. 1, but extends somewhat to the left thereof. At a suitable position, a cam 48a (FIG. 5) is located, formed with an inclined engagement surface 49 and facing the side of the chamber 1 through which the cassette is to be inserted. The cam 48a is located in alignment with the pin 16 and positioned for engagement therewith.

Operation, with reference, sequentially, to FIGS. 1-4: Upon insertion, the cassette 10 is positioned adjacent at the right side of, and to the receiver chamber 1, as shown in FIG. 1. The levers 32, 33, 34 will have the position as shown in FIG. 1, the ejection lever 33 being pulled by spring 42 against the stop 45 and the transfer lever 32 being maintained in the position shown in FIG. 1 either by a suitable stop—not shown— or by suitable dimensioning of the springs, the attachment points 47, 48 of spring 46, the length of the coupling link 34, and the dimension of the guide track 39 in which the pin 38 on link 34 slides, as well as the position of the pivot point 37 between the link 34 and the transfer lever 32.

Pin 16—FIGS. 5, 7—extends through the bore 26 of the housing 11 of the cassette and holds the carrier 12 secure within the housing of the cassette.

Upon movement of cassette 10 towards the left—FIG. 1—the cassette 10 will be received within the chamber 1. The head 23 of the pin 16 will engage in the cam track 41 of transfer lever 32. Further, the projecting cam 31 on the cassette housing 11 will engage the cam track 40 of the transfer lever 32. Upon further movement of the housing 10 of the cassette 11 in the direction of the arrow 50—FIG. 1—the transfer lever 32 will be rotated in clockwise direction by the forces applied by the pin 16 and by the projection 31. The cassette will reach the position shown in FIG. 2. The cam tracks 40, 41 of the transfer lever 32 are so shaped that, during movement of the cassette 10, the transfer lever 32 will, initially, not cause any relative movement between the projection 31 and the pin 16. As the cassette 10 is inserted into the chamber 1, pin 16 is pressed downwardly by engagement with surface 49 of cam 48a counter the direction of the spring 24 (FIG. 7) to release engagement of the flange 22 with the center or core of the reel, thus removing the stopping brake of the reel carrier 12 within the housing 11 of the cassette. The effect or the positioning of the pin 16 will be such that the pin 16 then can move freely within the housing 11 of the cassette. Rather than placing the pin 16 in the core of a reel, the pin 16 can also be formed to engage the top wall of the cassette 11 at positions adjacent the opening slot 25. Regardless of how the braking effect is obtained, insertion movement of the cassette into the chamber 1 will cause the pin 16 to be depressed and thus release engagement thereof which permits its longitudinal movement in the slot 25.

Figure 3:
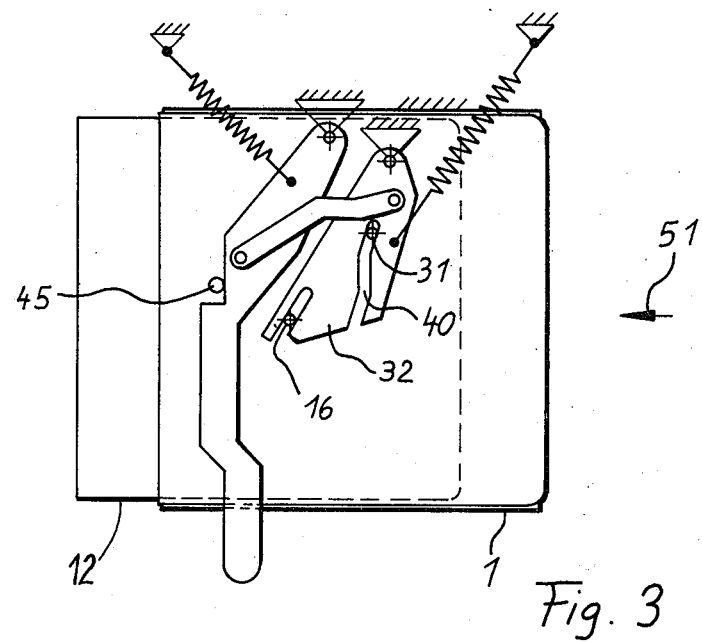
FIG. 3 is a view similar to FIG. 2, in which the tape cassette has been entirely inserted.

As the cassette is further moved towards the left—see arrow 51, FIG. 3—the transfer lever 32 will continue to rotate in clockwise direction due to engagement with the projecting cam 31 on the top side of the housing 11 of the cassette. Due to the different lever arms formed by the spaced connection of the tracks 40, 41 from the pivot point 35 of lever 32, pin 16 coupled to the plate 12 and hence to the reels 14, 15 is moved a greater distance than pin 31 coupled to the cassette housing 11. The speed of movement of pin 16, also, will be higher than that of pin 31. This movement, in the direction of arrow 51, moves the cassette carrier plate 12, and with it the cassette reels, towards the left in the direction of the arrow 51 and out of the housing 11 of the cassette 10. Threading guide elements forming part of the video recording threading system—see the referenced U.S. Pat. Nos. 4,259,700 and 4,254,922, can then engage the tape for threading thereof, automatically, in a predetermined tape path for subsequent transducing of information by magnetic tape recording. Thus, movement of the tape cassette 10, that is its housing 11 controls, simultaneously and automatically, an additional movement of the tape reels therein or, rather, the carrier 12 therefor to which the pin 16 is connected, out of the reel housing 11, for placing the tape reels in threading position—see FIG. 3.

Figure 2:
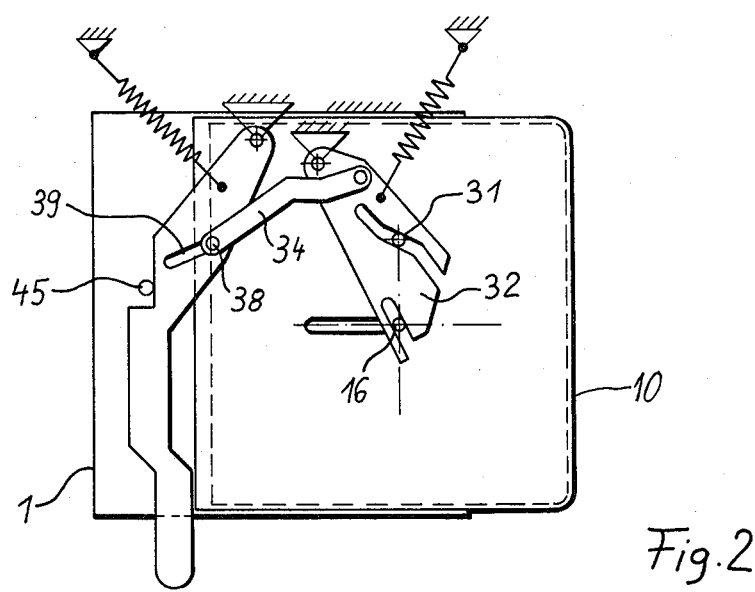
FIG. 2 is a highly schematic top view in which the tape cassette, shown ready for insertion in FIG. 1, has been partly inserted.

As the transfer lever 32 moves from the position of FIG. 1 through the position of FIG. 2 into the position of FIG. 3, coupling lever 34 also moves to the left. The ejection lever 33 does not move, however, since the pin 38 can slide in the slot 39, in a lost-motion arrangement. Ejection lever 33, thus, maintains the same position during the insertion movement as seen by the sequential FIGS. 1, 2, 3.

Figure 4:
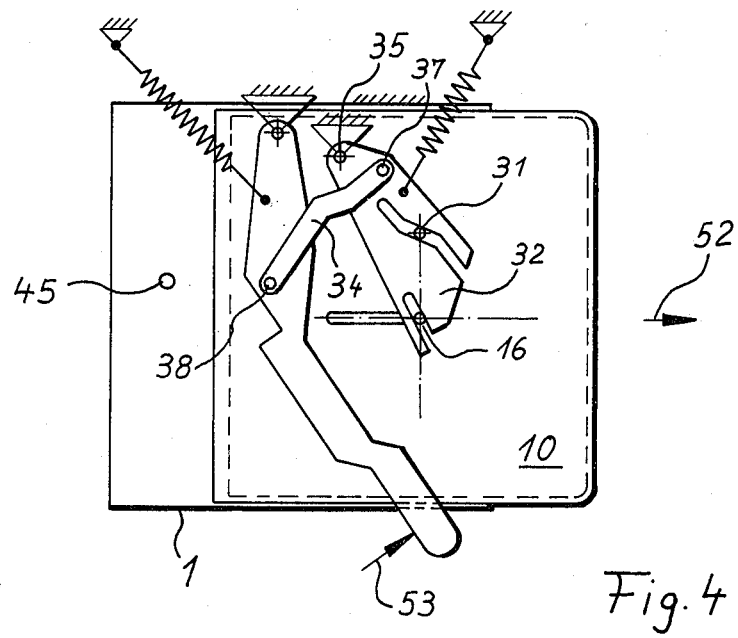
FIG. 4 is a view similar to FIG. 3 during removal of the tape cassette.

To eject a cassette 10 from the chamber 1, ejection lever 33 is manually moved in the direction of the arrow 53—FIG. 4, in counterclockwise direction and away from the stop 45. Since the guide pin 38 is attached to the coupling lever 34 already had its end position within the cam track 39, coupling lever 34 will be engaged and will transfer movement via the pivot point 37 to the transfer lever 32, rotating the transfer lever 32 in counterclockwise direction and thereby moving the cam 31 and the pin 16, sliding, respectively, in tracks 40, 41 in the direction of the arrow 52 (FIG. 4). Due to the different distance of the cam 31 and pin 16, respectively, from the pivot point 35 of the transfer lever 32, pin 16 will move with substantially higher speed in the direction of the arrow 52 than the cam 31 secured to the housing 11 of the cassette; in the same time, thus, the pin 16 and with it the reel carrier 12 connected thereto will move over a greater distance. At the final position, the various elements will be placed as shown in FIG. 4. Pin 16 has been removed from the range of the cam 48, past the inclined surface 49; spring 24 has pushed the head 23 of the pin 16 again into the enlarged bore 26 of the slot 25 (FIG. 6) and stops the reel carrier 12 within the housing 11. The cassette 10 can now be removed, manually, in the direction of the arrow 52. The transfer lever 32, by final engagement with the pins 31 and 16, will then be moved into the position shown in FIG. 1. The receiver is now ready to receive the same cassette or another cassette for further threading and transducing of information from tape stored therein.

Various changes and modifications may be made within the scope of the inventive concept; for example, the various levers can be differently constructed. Specifically, rather than using a single-arm transfer lever 32 with a fixed position of rotation on the receiver, a double-arm lever can be used; the arrangement of camming surfaces and cam tracks can be reversed; the pivot point for lever 32, for example, either in the single-arm arrangement as shown or in a double-arm arrangement, can also be placed on the housing 11 of the cassette 10 with an engagement cam located, for example, on the top wall 5 of the receiver 1 to move the lever pivoted on the cassette housing and push pin 16 to the left as the cassette is inserted into the receiver. Since this places a movable element on the cassette, such a lever is more subject to damage than placing the movable components of the system on the receiver and placing only the cam projection 31 and the projecting pin 16 on the cassette. The essential movement, as commanded in accordance with the present invention, namely moving the reels, for example by moving the carrier plate to which they are secured upon insertion movement of the cassette housing, can be arranged in various ways.

We claim:

1. A tape transducing system comprising the combination of a tape cassette (10) including a cassette housing (11) open at one end, a tape reel carrier (12) longitudinally slidably mounted in the cassette housing for sliding movement in a plane transverse to the winding axis of the tape reels, for carrying tape reels (14, 15) thereon in superposed relation, and operating engagement means (16) coupled to the tape reel carrier (12);

with a tape cassette receiver including a support structure defining a receiver chamber (1) open at one side to receive said cassette housing (11) with the tape reel carrier (12) and tape reels (14, 15) thereon upon sliding movement of the cassette housing (11) into said chamber, a movable lever (32) secured to the support structure positioned to be engageable by said cassette housing (11);

and coupling means (41) for coupling the lever (32) to the operating and engagement means (16) of the tape reel carrier (12) and effecting longitudinal removing sliding movement of the tape reel carrier (12) and said reels (14, 15) thereon out of the cassette housing (11) upon insertion movement of the cassette housing into said chamber.

2. System according to claim 1, wherein said lever (32) is pivoted at a fixed pivot point (35) to the support structure;

said lever including a first engagement zone (40) for engagement with the cassette housing (12) spaced from the pivot point, and wherein the coupling means (41) for engagement with the operating and engagement means (16) of the cassette are located on said lever at a position having a spacing from said pivot point which differs from that of the engagement zone.

3. System according to claim 2, wherein said lever (32) is a single-arm lever;

said support structure of the receiver includes a cover plate (5), and wherein a pivot shaft (35) is provided pivotably supporting said lever at said pivot point on the cover plate (5).

4. System according to claim 2, wherein the engagement zone comprises a first cam track formed on the lever, and a cam follower (31) formed on the cassette housing (11) and engageable with the first cam track;
said coupling means comprises a second cam track (41) spaced from the pivot point (35) farther than said first cam track;
and the operating and engagement means includes a projecting pin (16) projecting from a surface of said cassette housing (11).

5. System according to claim 1, further including an ejection lever (33) secured to said structure, and a lost-motion linkage (34, 38, 39) coupling the ejection lever (33) said first lever.

6. System according to claim 5, wherein said lost-motion linkage comprises a lost-motion lever (34) pivoted to one of said levers (32, 33) and engageable with a slot (38) in the other of said levers.

7. System according to claim 6, further comprising spring means retaining said levers in a first, quiescent position and being tensioned upon insertion of a cassette housing (11) therein, said spring means and the positions of the pivot points pivoting said levers being selected for positioning of said levers in balanced relationship, when in said quiescent position.

8. System according to claim 1, wherein
the operating and engagement means includes a depressible pin (16) for engagement with said coupling means and in quiescent position a braking force, exerting against at least one of said reels;
and a cam track (48, 49) positioned on said support structure in the path of said depressible pin upon insertion movement of the cassette housing (11) into the chamber (1) to depress the pin and thereby release the braking effect and permit the reels to rotate freely and hence withdrawal of tape therefrom.

9. System according to claim 1, wherein the lever (32) has a shorter and a longer lever arm;
the shorter arm is arranged for engagement by the cassette to move the lever;
and the longer arm includes said coupling means (42) and is positioned for engagement by the operating engagement means (16).

10. In a recording tape spooling apparatus to receive a tape cassette in which the tape cassette has a cassette housing structure (11) open at one end,
a tape reel carrier (12) and at least one tape reel (14, 15) secured to said carrier, said carrier being longitudinally slidably mounted in said tape cassette housing (11) for sliding motion in a plane transverse to the winding axis of said at least one tape reel,
a tape cassette receiver construction comprising
a support structure defining a receiving chamber (1) open at one side and positioned and dimensioned to receive said tape reel carrier (12) and the at least one tape upon sliding movement of the cassette housing (11) into the chamber;
an operating lever (32) secured to one of said structure and positioned for engagement with the other of the structures at a lever position defining a first lever arm upon said sliding insertion movement of the cassette housing (11) into the chamber;
first coupling means (16) on one of said structures;
and second coupling means (41) on the lever,
said first and second coupling means being positioned for mutual coupling engagement, and with a lever arm longer than said first lever arm, and for coupling said lever to the tape reel carrier (12) and commanding longitudinal sliding movement of the tape reel carrier (12) out of the cassette housing (11) upon insertion movement of the cassette housing (11) into said chamber and deflection of said lever upon engagement with the other of said structures.

11. Apparatus according to claim 10, wherein the lever arms of engagement of said lever with said one structure and with said coupling means, respectively, are different.

* * * * *